(12) United States Patent
Tan et al.

(10) Patent No.: US 12,146,584 B2
(45) Date of Patent: Nov. 19, 2024

(54) SOLENOID VALVE AND VEHICLE GAS CYLINDER VALVE HAVING THE SOLENOID VALVE

(71) Applicant: YAPP AUTOMOTIVE PARTS (KAIFENG) CO., LTD., Henan (CN)

(72) Inventors: Guanghui Tan, Henan (CN); Shaowen Hu, Henan (CN); Lin Jiang, Henan (CN); Yinchun Liu, Henan (CN); Kaige He, Henan (CN)

(73) Assignee: YAPP AUTOMOTIVE PARTS (KAIFENG) CO., LTD., Henan (CN)

( * ) Notice: Subject to any disclaimer, the term of this patent is extended or adjusted under 35 U.S.C. 154(b) by 28 days.

(21) Appl. No.: 18/344,806

(22) Filed: Jun. 29, 2023

(65) Prior Publication Data

US 2024/0003463 A1 Jan. 4, 2024

(30) Foreign Application Priority Data

Jul. 1, 2022 (CN) .......................... 202210774703.4

(51) Int. Cl.
*F16K 31/40* (2006.01)
*F17C 13/04* (2006.01)

(52) U.S. Cl.
CPC ............ *F16K 31/408* (2013.01); *F17C 13/04* (2013.01); *F17C 2201/0104* (2013.01); *F17C 2201/056* (2013.01); *F17C 2205/0323* (2013.01); *F17C 2270/0168* (2013.01)

(58) Field of Classification Search
CPC .................... F16K 31/408; F17C 13/04; F17C 2201/0104; F17C 2201/056; F17C 2205/0323; F17C 2270/0168
See application file for complete search history.

(56) References Cited

U.S. PATENT DOCUMENTS

| | | | |
|---|---|---|---|
| 5,309,945 A * | 5/1994 | Sakai | F17C 13/04 137/861 |
| 5,813,429 A * | 9/1998 | Ohtaka | F17C 5/06 137/341 |
| 6,929,028 B2 * | 8/2005 | Larsen | F16K 17/003 137/614.19 |
| 9,644,793 B2 * | 5/2017 | Lee | F17C 13/04 |
| 10,006,559 B2 * | 6/2018 | Kubo | F16K 31/408 |

(Continued)

FOREIGN PATENT DOCUMENTS

| | | |
|---|---|---|
| CN | 113503467 | 10/2021 |
| CN | 215635009 | 1/2022 |

*Primary Examiner* — John Bastianelli
(74) *Attorney, Agent, or Firm* — JCIPRNET

(57) ABSTRACT

A solenoid valve and a vehicle gas cylinder valve having the solenoid valve are provided. The solenoid valve includes a casing, a pilot head, a main valve seat, and a pilot valve core. An outer peripheral surface of the casing is provided with a clearance fit surface, and the clearance fit surface is configured for clearance fit with a solenoid valve installation passage to form a bypass gas passage between the casing and the solenoid valve installation passage. The casing is provided with an upper casing ventilation hole and a lower casing ventilation hole. The upper casing ventilation hole communicates with an upper portion of the bypass gas passage and a pilot head upper chamber, and the lower casing ventilation hole communicates with a lower portion of the bypass gas passage and a pilot head lower chamber.

18 Claims, 2 Drawing Sheets

(56) References Cited

U.S. PATENT DOCUMENTS

| | | | | |
|---|---|---|---|---|
| 10,480,677 B2* | 11/2019 | Hwang | ................... | F16K 1/126 |
| 10,907,749 B2* | 2/2021 | Lee | ..................... | F16K 31/0693 |
| 2020/0292091 A1* | 9/2020 | Numazaki | ............. | F16K 31/408 |

* cited by examiner

SOLENOID VALVE AND VEHICLE GAS CYLINDER VALVE HAVING THE SOLENOID VALVE

CROSS-REFERENCE TO RELATED APPLICATION

This application claims the priority benefit of China application serial no. 202210774703.4, filed on Jul. 1, 2022. The entirety of the above-mentioned patent application is hereby incorporated by reference herein and made a part of this specification.

BACKGROUND

Technical Field

The disclosure relates to a solenoid valve used in a high-pressure gas flow passage, and in particular, relates to a solenoid valve and a vehicle gas cylinder valve having the solenoid valve.

Description of Related Art

At present, vehicle gas cylinder valves (hereinafter referred to as cylinder valves) are generally used for the storage and supply of gases such as vehicle fuels (hydrogen, natural gas), and the main functions of these cylinder valves include filling the cylinder with gas, supplying gas to gas-consuming equipment, and quickly releasing gas when gas should be released (pressure or temperature exceeds the limit). The basic structure and function of this type of cylinder valves can be found in the patent literature with the application publication number of CN113503467A. Regarding a cylinder valve of this type, the base body of the cylinder valve includes two parts, that is, the block base body outside a gas cylinder when it is installed with the gas cylinder and the columnar base body extending into the inside of the gas cylinder. The columnar base body is provided with an external thread for screwing into the internal thread of the container mouth to achieve the tight and secure connection between the cylinder valve and the container. Functional parts that implement the above functions, such as various valves, are all installed on or in the base body. The solenoid valve installed in the base body is required to be used so as to allow the gas supply function to implement start-stop and flow control. The solenoid valve of the cylinder valve is arranged on the block base body.

The solenoid valve arranged on this type of cylinder valve is usually a normally closed pilot solenoid valve. Its structure and function can be found in the related art such as "SOLENOID VALVE, CYLINDER VALVE HAVING SAME, GAS STORAGE DEVICE AND VEHICLE" disclosed in the patent literature CN215635009U. The pilot head (that is, the valve core body) is movably assembled in the casing (that is, the electromagnetic casing) in the up and down direction. The lower portion of the casing is provided with a main valve seat, and a lower casing ventilation hole is provided at a position close to the main valve seat on the casing. The lower casing ventilation hole communicates with the high-pressure gas inlet port on the solenoid valve installation passage for the entry of high-pressure gas. A main valve port and a gas outlet port communicating with the main valve port are arranged in the center of the main valve seat. The upper portion of the casing is provided with a solenoid assembly (the solenoid assembly includes an electromagnetic coil, a fixed iron core, and a movable iron core) and a pilot valve core, and the middle portion of the pilot head is in sliding and sealing fit with the casing. A pilot head upper chamber, a slidably-sealed structure, and a pilot head lower chamber are arranged between the pilot head and the casing. A lower end of the pilot head fits with the main valve seat to form a sealing structure for the main valve port. An upper end of the pilot head is provided with a pilot valve port, and the pilot valve port fits with the pilot valve core to form a sealing structure for the pilot valve port. The pilot head is provided with a release hole passing through the upper and lower ends of the pilot head. The release hole communicates with the gas outlet port through the main valve port of the main valve seat, and the pilot valve core is driven by the solenoid assembly to open and close the pilot valve port. A bypass gas passage is also provided in the pilot head. The bypass gas passage is formed by connecting two sections of holes, the first hole section extends radially from the side of the pilot head to the inside of the pilot head, and the second hole section extends axially from the rear end surface of the pilot head to the inside of the pilot head. The first hole section is also provided with a necked throttling section, and the function of the throttling section is to slow down the flow velocity of the high-pressure gas. The bypass gas passage communicates with the high-pressure gas inlet port through the lower casing ventilation hole. Its basic working principle is: when the solenoid assembly drives the pilot valve core to close the pilot valve port, the release hole is closed, and the upper end of the pilot head does not communicate with the gas outlet port. The bypass gas passage can replenish the high-pressure gas from the high-pressure gas inlet port to the upper end of the pilot head (the pilot head upper chamber) to push the pilot head down and close the main valve port. When the solenoid assembly drives the pilot valve core to open the pilot valve port, the release hole is opened, and the upper end of the pilot head communicates with the gas outlet port to release pressure to the gas outlet port. The high-pressure gas flowing through the bypass gas passage is slowed down by the aforementioned throttling section, so it cannot be replenished to the upper end of the pilot head in time, and then a pressure difference is formed to push the pilot head upwards and open the main valve port.

The first hole section and the second hole section of the bypass gas passage provided by the pilot head of the abovementioned solenoid valve are arranged at 900 to each other, and a necking section is required to be processed in the first hole section. The size of the necking section is small, and it is necessary to ensure that the axes of the two hole sections intersect as much as possible. It thus can be seen that the processing process is complicated and the yield rate is low, so more costs are thereby required.

SUMMARY

The disclosure aims to provide a solenoid valve to solve the problem of complicated processing and high costs caused by processing a bypass gas passage in a pilot head in the related art and provide vehicle gas cylinder valve having the solenoid valve for cost reduction.

The disclosure provides a solenoid valve including a casing, a pilot head, a main valve seat, and a pilot valve core. The pilot head and the main valve seat are coaxially arranged in the casing up and down along a central axis of the solenoid valve. An upper end of the main valve seat is provided with a main valve port, and an upper end of the pilot head is provided with a pilot valve port. A release hole is provided in the pilot head. A pilot head upper chamber, a slidably-sealed structure, and a pilot head lower chamber are arranged between the pilot head and the casing. An outer peripheral surface of the casing is provided with a clearance fit surface, and the clearance fit surface is configured for clearance fit with a solenoid valve installation passage to form a bypass gas passage between the casing and the solenoid valve installation passage. A lower portion of the bypass gas passage communicates with a high-pressure gas inlet port on the solenoid valve installation passage. The casing is provided with an upper casing ventilation hole and a lower casing ventilation hole. The upper casing ventilation hole communicates with an upper portion of the bypass gas passage and the pilot head upper chamber, and the lower casing ventilation hole communicates with the lower portion of the bypass gas passage and the pilot head lower chamber. An airflow damping structure for slowing down a gas flow velocity is provided on the upper casing ventilation hole and/or the clearance fit surface. The airflow damping structure on the upper casing ventilation hole is configured to be a cross-sectional surface with a cross-sectional area not greater than a minimum cross-sectional area in the release hole, so that the upper casing ventilation hole is able to slow down a cross-sectional area of the gas flow velocity. The airflow damping structure of the clearance fit surface is located between the upper casing ventilation hole and the lower casing ventilation hole and is configured to fit with a corresponding structure of the solenoid valve installation passage to slow down the gas flow velocity.

In the disclosure, the upper casing ventilation hole is provided and the bypass gas passage is formed between the clearance fit surface on the outer side of the casing and the solenoid valve installation passage to replace the bypass gas passage opened in the pilot head in the related art. Further, by opening the upper casing ventilation hole on the casing, the pilot head upper chamber communicates with the high-pressure gas inlet port on the solenoid valve installation passage through the bypass gas passage and the upper casing ventilation hole. Further, the gas flow damping structure provided on the upper casing ventilation hole and/or the clearance fit surface slows down the gas flow velocity, and the bypass gas passage delays the entry of high-pressure gas into the upper end of the pilot head when the solenoid valve is opened. Compared to the arrangement of arranging the bypass gas passage on the pilot head in the related art, the arrangement of processing the upper casing ventilation hole on the casing and arranging the clearance fit surface outside the casing can be easily processed and achieved.

Further, the airflow damping structure is an external thread section and is configured to form a threaded connection structure with an internal thread section on the solenoid valve installation passage. Screw teeth of the threaded connection structure are arranged in an alternating manner to form a turning gas passage to slow down the gas flow velocity.

Further, the outer peripheral surface of the casing is provided with an annular groove above the external thread section. An upper portion of the annular groove is configured to allow installation of a casing sealing ring, and the casing sealing ring is configured to sealingly fit with the solenoid valve installation passage. The clearance fit surface is located below the casing sealing ring, and the upper casing ventilation hole is provided on a lower portion of a groove bottom wall of the annular groove. The upper casing ventilation hole is provided in the sealing ring installation groove of the casing for installation of the casing sealing ring, so the processing process can be easily carried out, and further, compared to the vertically arranged two-stage bypass holes in the related art (refer to the patent literature CN215635009U mentioned in the BACKGROUND section), such an arrangement is easier to be achieved.

Further, the annular groove is adjacent to the external thread section, and the annular groove or a portion of the annular groove is an escrape formed when an external thread is processed. In this way, the annular groove is able to be formed in one step when the thread section is processed, so the processing efficiency is improved.

Further, the slidably-sealed structure is a pilot head sealing ring fixed to and sleeved on the pilot head through a convex ring and a limit circlip provided on a middle portion of the pilot head.

Further, the release hole includes a first pilot release passage and a second pilot release passage distributed up and down. The first pilot release passage communicates with the pilot valve port. A cross-sectional area A of the first pilot release passage is less than a cross-sectional area of the second pilot release passage. The upper casing ventilation hole is a straight hole, and a cross-sectional area B of the upper casing ventilation hole satisfies: $A/3 \leq B \leq A$.

Further, a front end of the pilot valve core has a pilot valve core cone surface and a pilot sealing spherical surface at a top end of the pilot valve core cone surface. The pilot valve port has a pilot head valve port fillet, and the pilot head valve port fillet matches and fits with the pilot sealing spherical surface.

Further, the pilot valve core is made of metal, and the pilot head is made of plastic. The pilot head valve port fillet is formed by the pilot sealing spherical surface of the pilot valve core impacting the pilot valve port.

Further, the pilot valve core is made of hydrogen embrittlement resistant stainless steel, and the pilot head is made of polyether ether ketone.

The disclosure further provides a vehicle gas cylinder valve having a base body. The base body is provided with a gas outlet passage, a gas inlet and outlet passage, and a solenoid valve installation passage for installation of a solenoid valve. The gas outlet passage is configured to communicate with an inner portion of a gas cylinder, the gas inlet and outlet passage communicates with a gas inlet and outlet port on the base body, and the solenoid valve installation passage communicates with the gas outlet passage and the gas inlet and outlet passage. The solenoid valve installation passage is provided with the solenoid valve according to the above.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
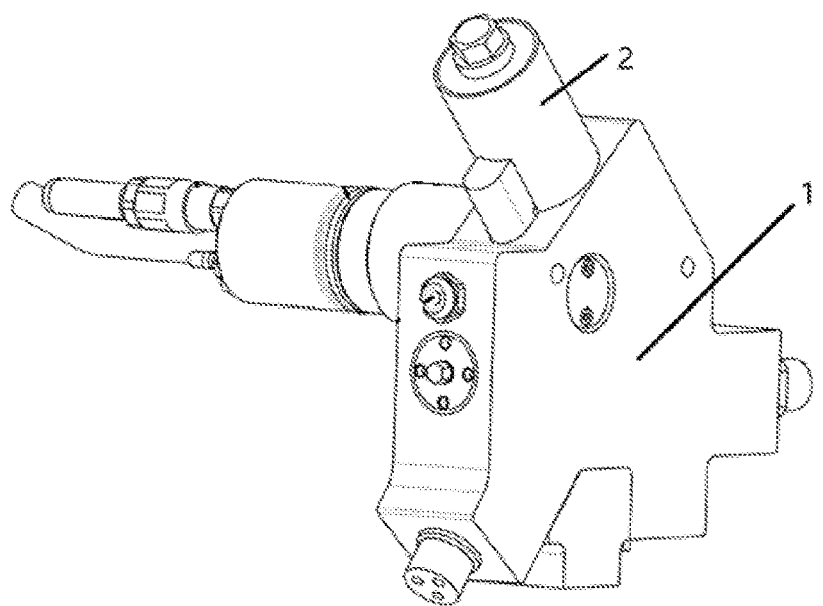
FIG. 1 is a three-dimensional view of a vehicle gas cylinder valve according to an embodiment of the disclosure.
Figure 2:
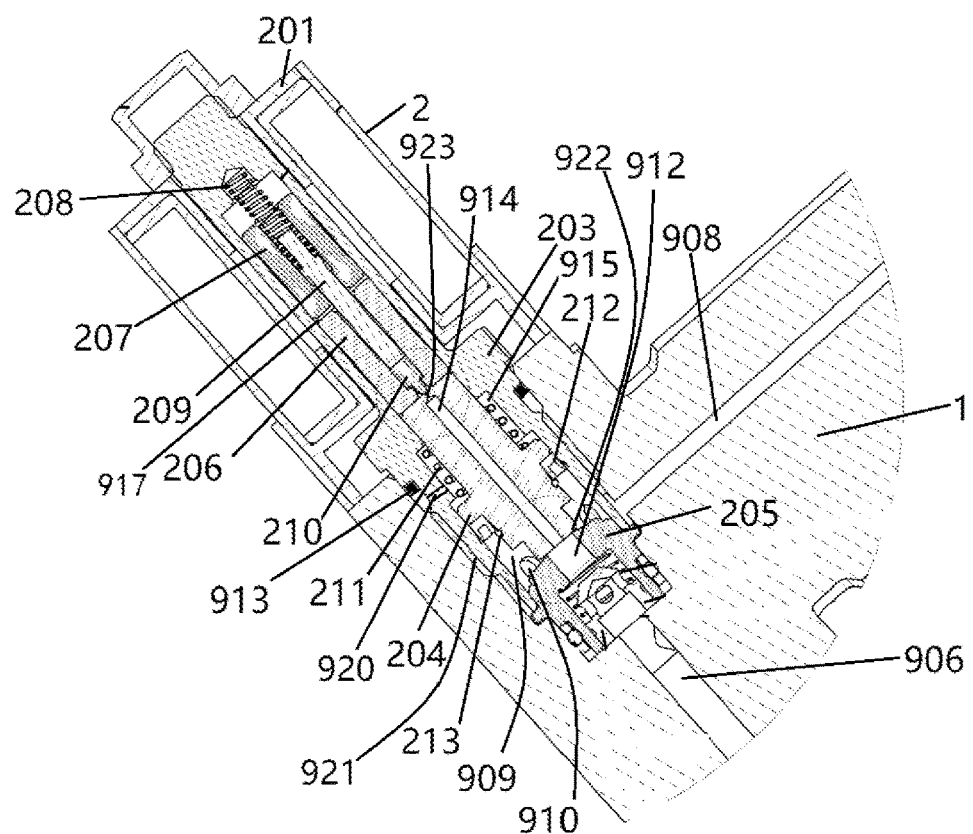
FIG. 2 is a schematic structural view of a solenoid valve in FIG. 1.
Figure 3:
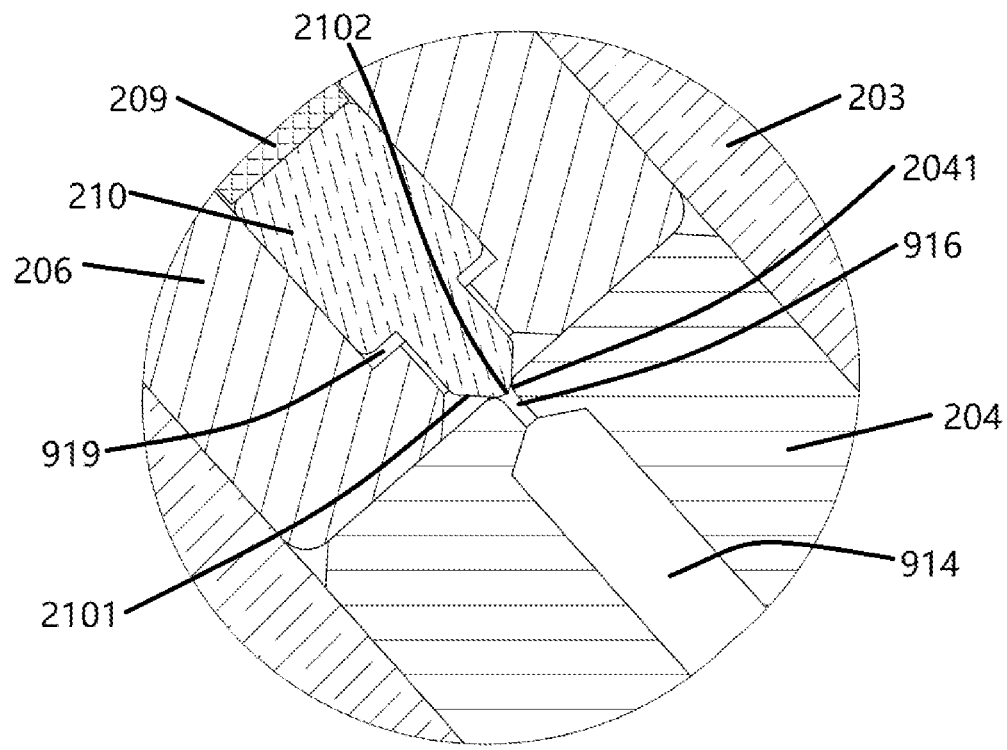
FIG. 3 is an enlarged schematic view of a pilot valve port of the solenoid valve in FIG. 2.

In an embodiment of the disclosure, a vehicle gas cylinder valve is provided, and as shown in FIG. 1 to FIG. 3, the vehicle gas cylinder valve includes a base body 1 and a solenoid valve 2 installed on the base body 1. The base body 1 is provided with a gas passage and a solenoid valve installation passage for installation of the solenoid valve 2, and the solenoid valve installation passage communicates with a corresponding position in the gas passage. As shown in FIG. 2, the gas passage in the base body 1 includes a gas outlet passage 908 and a gas inlet and outlet passage 906. The gas outlet passage 908 is configured to communicate with an inner portion of a gas cylinder, the gas inlet and outlet passage 906 communicates with a gas inlet and outlet port on the base body 1, and the solenoid valve installation passage communicates with the gas outlet passage 908 and the gas inlet and outlet passage 906. The solenoid valve 2 is configured to conduct or block the gas outlet passage 908 and the gas inlet and outlet passage 906. When the solenoid valve 2 is opened, the gas outlet passage 908 communicates with the gas inlet and outlet passage 906, so that the inner portion of the gas cylinder communicates with the gas inlet and outlet port, and the vehicle gas cylinder valve may then supply gas to the outside. The basic structure and functions of the vehicle gas cylinder valve belong to the related art, and reference can be made to the patent literature with the application publication number CN113503467A mentioned in the BACKGROUND section. The focus of this embodiment is to introduce the improved structure in the solenoid valve 2 compared to the related art.

The solenoid valve 2 includes a casing 203, a solenoid assembly, a pilot head 204, a main valve seat 205, and a pilot valve core 210. The pilot head 204 and the main valve seat 205 are coaxially arranged in the casing 203 up and down along a central axis of the solenoid valve 2. The center of the main valve seat 205 is provided with a main passage 912 passing through the main valve seat 205 up and down. An upper end of the main valve seat 205 is provided with a main valve port 922 communicating with the main passage 912, and the main valve port 922 is opened or closed by the separation or abutment of the pilot head 204 and the main valve seat 205. A passage opening at a lower end of the main passage 912 forms a gas outlet port, and the gas outlet port communicates with the gas inlet and outlet passage 906.

The pilot head 204 moves up and down and is assembled in the casing 203, and a lower end of the pilot head 204 fits with the main valve seat 205 to form a sealing structure for the main valve port 922. An upper end of the pilot head 204 is provided with a pilot valve port 923, and the pilot valve port 923 fits with the pilot valve core 210 to form a sealing structure for the pilot valve port 923. The pilot head 204 is provided with a release hole passing through the upper and lower ends of the pilot head 204. An upper end of the release hole communicates with the pilot valve port 923, and a lower port at a lower end of the release hole is inside the sealing structure of the pilot valve port 923 at the lower end of the pilot head 204. Therefore, the release hole can communicate with the gas outlet port through the main valve port 922 and the main passage 912 of the main valve seat 205 to achieve airflow relief. In this embodiment, the release hole has two sections: a first pilot release passage 916 and a second pilot release passage 914. A cross-sectional area of the first pilot release passage 916 is less than a cross-sectional area of the second pilot release passage 914. A middle portion of the pilot head 204 and the casing 203 are in a sliding and sealing fit through a slidably-sealed structure, and a pilot head upper chamber 915 and a pilot head lower chamber 909 are formed between the pilot head 204 and the casing 203 with the slidably-sealed structure as the boundary. The pilot head upper chamber 915 communicates with the upper end of the pilot head 204, and the pilot head lower chamber 909 communicates with the lower end of the pilot head 204. Specifically, the slidably-sealed structure is a pilot head sealing ring 212 fixed to and sleeved on the pilot head 204 through a convex ring and a limit circlip 213 provided on the middle portion of the pilot head 204. A pilot head spring 211 is installed between the convex ring on the middle portion of the pilot head 204 and the casing 203, and the pilot head spring 211 is configured to exert a downward force on the pilot head 204 to tighten the main valve port 922.

The pilot valve core 210 is driven by the solenoid assembly to open and close the pilot valve port 923. The solenoid assembly is installed at a rear end of the casing 203 and includes an electromagnetic coil 201, a first iron core 206, a second iron core 207, a thimble 209, and a compression spring 208. The structure and function of the solenoid assembly belongs to the related art, and it is configured to drive the pilot valve core 210 to move up and down to open and close the pilot valve port 923.

The casing 203 is a hollow cylinder, the axis of the hollow cylinder coincides with the central axis of the solenoid valve 2, and the casing 203 is inserted into the solenoid valve installation passage. The outer peripheral surface of the casing 203 is provided with a casing sealing ring 913 and a clearance fit surface below the casing sealing ring 913, and the casing sealing ring 913 sealingly fits with the solenoid valve installation passage. The clearance fit surface is configured for clearance fit with the solenoid valve installation passage to form a bypass gas passage between the casing 203 and the solenoid valve installation passage. In this embodiment, the bypass gas passage is formed by an annular clearance extending axially.

A middle portion of the clearance fit surface is provided with an airflow damping structure for fitting with a corresponding structure of the solenoid valve installation passage to slow down a gas flow velocity. Specifically, the airflow damping structure is an external thread section and is configured to form a threaded connection structure 921 with an internal thread section on the solenoid valve installation passage. Screw teeth of the threaded connection structure 921 are arranged in an alternating manner to form a turning gas passage to slow down the gas flow velocity. In some embodiments, the airflow damping structure may also be a concave-convex undulating structure of another form distributed in an axial direction, such as a helical curved groove or a plurality of parallel ring grooves. Certainly, in other embodiments, the concave-convex undulating structure may also be provided only on one of the solenoid valve installation passage and the clearance fit surface, and the other provides a fitting surface corresponding to the concave-convex undulating structure to form a throttling gap. The fitting surface may be a cylindrical surface. Certainly, in other embodiments, the abovementioned fitting surface may also be a textured or uneven surface.

The clearance fit surface of the casing 203 is provided an upper casing ventilation hole 920 and a lower casing ventilation hole 910 distributed up and down. The upper casing ventilation hole 920 and the lower casing ventilation hole 910 respectively communicates with upper and lower ends of the bypass gas passage. The upper casing ventilation hole 920 communicates with an upper portion of the bypass gas passage and the pilot head upper chamber 915. The casing 203 is provided with an annular groove above the aforementioned external thread section, and an upper portion of the annular groove adjacent to the external thread section is to allow installation of the casing sealing ring 913 to act as a sealing ring installation groove. Further, the annular groove is adjacent to the external thread section, and the annular groove or a portion of the annular groove is an escrape which is formed after an external thread is processed. Further, the upper casing ventilation hole 920 is provided on a lower portion of a groove bottom wall of the annular groove (sealing ring installation groove), so that the upper casing ventilation hole 920 may be easily positioned during processing and may be conveniently processed.

A lower intermittent fit section with a smaller outer diameter than the external thread section is provided on the clearance fit surface of the casing 203 below the external thread section. The lower casing ventilation hole 910 is opened on the lower intermittent fit section, and the lower casing ventilation hole 910 communicates with the lower portion of the bypass gas passage and the pilot head lower chamber 909. Further, the connection between a passage of the solenoid valve 2 and the gas outlet passage 908 (the gas outlet passage 908 communicates with the inside of the gas cylinder for gas releasing) is located at the lower portion of the bypass gas passage. That is, a high-pressure gas inlet port of the gas outlet passage 908 on a passage wall of the solenoid valve 2 communicates with the lower portion of the bypass gas passage. Therefore, the lower portion of the bypass gas passage communicates with the gas outlet passage 908 of the vehicle gas cylinder valve, so that the lower casing ventilation hole 910 of the casing 203 communicates with the gas outlet passage 908.

The working process of the solenoid valve 2 of the vehicle gas cylinder valve in the foregoing embodiments is provided as follows.

When the solenoid valve 2 is closed, the high-pressure gas in the gas cylinder passes through the gas outlet passage 908 and the lower casing ventilation hole 910 in sequence and reaches the pilot head lower chamber 909. Since the sealing structure of the main valve port 922 at the lower end of the pilot head 204 fits with the main valve seat 205, the main valve port 922 is cut off from the gas outlet passage 908, and the gas is blocked and cannot enter the gas inlet and outlet passage 906. At the same time, the high-pressure gas in the gas cylinder also enters the bypass gas passage between the casing 203 and a valve body from the gas outlet passage 908. Because the casing sealing ring 913 is arranged at the upper end of the bypass gas passage, the gas cannot flow out into the atmosphere. The gas in the upper portion of the bypass gas passage enters the pilot head upper chamber 915 through the upper casing ventilation hole 920 and further fills the entire gap inside the casing 203. Similarly, because of the sealing between the pilot valve core 210 and the pilot valve port 923 on the upper end of the pilot head 204, the high-pressure gas is blocked and cannot enter the first pilot release passage 916 and the second pilot release passage 914 of the release hole.

When the electromagnetic coil 201 is powered and turned on, the first iron core 206 and the second iron core 207 are adhered together. A first pilot chamber and a second pilot chamber are closed, the pilot valve core 210 is driven upwards to move away from the pilot head 204, and the pilot valve port 923 is opened. Due to the separation of the pilot head sealing ring 212, the pilot head lower chamber 909 does not communicate with the pilot head upper chamber 915, and the high-pressure gas around the pilot valve port 923 is quickly released to the downstream through the release hole, the main valve port 922, and the gas outlet passage 908. The gas in the gap between the upper end of the pilot head 204 and the casing 203, including the gas in the pilot head upper chamber 915, is also released through the abovementioned passage. Further, due to the throttling of the upper casing ventilation hole 920 and the damping effect of the threaded connection structure 921 between the casing 203 and the valve body, high-pressure gas cannot be replenished in time, so the pressure in the pilot head lower chamber 909 is instantly higher than the pressure in the pilot head upper chamber 915. From the formula F=PS, it can be seen that the pilot head 204 takes the pilot head sealing ring 212 as the dividing line to form a force difference, which pushes the pilot head 204 to move upwards and away from the main valve seat 205 (while the pilot valve port 923 is always open). The main valve port 922 is opened, and the solenoid valve 2 is fully opened.

When the solenoid valve 2 is powered off, the electromagnetic force disappears, the first iron core 206 is separated from the second iron core 207, and the pilot valve port 923 is closed. The aforementioned force difference between the pilot head 204 and the pilot head sealing ring 212 as the dividing line gradually disappears, and the main valve port 922 is closed immediately.

In the disclosure, the upper casing ventilation hole 920 is provided in the sealing ring installation groove of the casing 203 for installation of the casing sealing ring 913, so the processing process can be easily carried out, and further, compared to the vertically arranged two-stage bypass holes in the related art (refer to the patent literature CN215635009U mentioned in the BACKGROUND section), such an arrangement is easier to be achieved. Further, since the casing 203 and the solenoid valve installation passage of the base body 1 are connected through the threaded connection structure 921, the high-pressure gas needs to pass through the gaps among the internal screw teeth of the threaded connection structure 921 first before reaching the upper casing ventilation hole 920. The thread may act as a damper to effectively retard the gas, so that the solenoid valve 2 may be opened and closed faster. Further, since the threaded connection structure 921 provides an airflow damping structure, the task of gas throttling undertaken by the upper casing ventilation hole 920 can be shared. For instance, the cross-sectional area of the first pilot release passage 916 is A, and the cross-sectional area B of the upper casing ventilation hole 920 should be less than one-third of the cross-sectional area of the first pilot release passage 916, that is, B<A/3. However, since the threaded connection structure 921 shares the throttling task, the upper casing ventilation hole 920 can be configured as a straight hole. Further, a necking section for throttling is not required to be arranged in the upper casing ventilation hole 920, and the diameter of the upper casing ventilation hole 920 may be appropriately increased to the extent that the cross-sectional area of the upper casing ventilation hole 920 is equal to the cross-sectional area of the first pilot release passage 916, that is, A/3≤B≤A. In this way, it is easier to achieve processing cost reduction in processing.

Further, the pilot valve core 210 is made of metal, preferably hydrogen embrittlement resistant stainless steel, and the pilot head 204 is made of plastic, preferably polyether ether ketone. A front end of the pilot valve core 210 has a pilot valve core cone surface 2101 and a pilot sealing spherical surface at a top end of the pilot valve core cone surface 2101. The solenoid valve 2 is filled with the gas of rated working pressure. By switching the solenoid valve 2 continuously and rapidly several times, due to the impact of a pilot valve core spherical surface 2102 on the pilot head valve port fillet 2041 of the pilot head 204, the pilot head valve port fillet 2041 is plastically deformed and forms a reliable adhesion with a contact portion of the pilot valve core 210, and the sealing effect is thereby improved.

In the embodiments of the disclosure, the structure of the solenoid valve is the same as that of the solenoid valve 2 in the embodiment of the abovementioned vehicle gas cylinder valve.

In the foregoing embodiments, the cross-sectional area of the upper casing ventilation hole 920 is configured, and an external thread section is provided on the clearance fit surface outside the casing 203. Both of these designs act as airflow damping structures for delaying airflow. In other embodiments of the disclosure, the airflow damping structure may also be arranged only in the upper casing ventilation hole, that is, the airflow can be slowed down by reducing the cross-sectional area of the upper casing ventilation hole, and certainly, the airflow damping structure can also be arranged only outside the casing.

In addition, in other embodiments of the disclosure, the external thread section may also be replaced by the abovementioned helical curved groove or a plurality of annular grooves arranged in parallel.

In addition, in other embodiments, in the case of not pursuing the ultimate processing convenience, the position of the upper casing ventilation hole outside of the casing, the annular groove for installation of the casing sealing ring, and the external thread section may also be designed separately.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A solenoid valve, comprising a casing, a pilot head, a main valve seat, and a pilot valve core, wherein the pilot head and the main valve seat are coaxially arranged in the casing up and down along a central axis of the solenoid valve, an upper end of the main valve seat is provided with a main valve port, an upper end of the pilot head is provided with a pilot valve port, a release hole is provided in the pilot head, and a pilot head upper chamber, a slidably-sealed structure, and a pilot head lower chamber are arranged between the pilot head and the casing, wherein an outer peripheral surface of the casing is provided with a clearance fit surface, the clearance fit surface is configured for clearance fit with a solenoid valve installation passage to form a bypass gas passage between the casing and the solenoid valve installation passage, a lower portion of the bypass gas passage communicates with a high-pressure gas inlet port on the solenoid valve installation passage, the casing is provided with an upper casing ventilation hole and a lower casing ventilation hole, the upper casing ventilation hole communicates with an upper portion of the bypass gas passage and the pilot head upper chamber, the lower casing ventilation hole communicates with the lower portion of the bypass gas passage and the pilot head lower chamber, an airflow damping structure for slowing down a gas flow velocity is provided on the upper casing ventilation hole and/or the clearance fit surface, the airflow damping structure on the upper casing ventilation hole is configured to be a cross-sectional surface with a cross-sectional area not greater than a minimum cross-sectional area in the release hole, so that the upper casing ventilation hole is able to slow down a cross-sectional area of the gas flow velocity, and the airflow damping structure of the clearance fit surface is located between the upper casing ventilation hole and the lower casing ventilation hole and is configured to fit with a corresponding structure of the solenoid valve installation passage to slow down the gas flow velocity.

2. The solenoid valve according to claim 1, wherein the airflow damping structure is an external thread section and is configured to form a threaded connection structure with an internal thread section on the solenoid valve installation passage, and screw teeth of the threaded connection structure are arranged in an alternating manner to form a turning gas passage to slow down the gas flow velocity.

3. The solenoid valve according to claim 2 wherein the release hole comprises a first pilot release passage and a second pilot release passage distributed up and down, the first pilot release passage communicates with the pilot valve port, a cross-sectional area A of the first pilot release passage is less than a cross-sectional area of the second pilot release passage, the upper casing ventilation hole is a straight hole, and a cross-sectional area B of the upper casing ventilation hole satisfies: $A/3 \leq B \leq A$.

4. The solenoid valve according to claim 2, wherein a front end of the pilot valve core has a pilot valve core cone surface and a pilot sealing spherical surface at a top end of the pilot valve core cone surface, the pilot valve port has a pilot head valve port fillet, and the pilot head valve port fillet matches and fits with the pilot sealing spherical surface.

5. The solenoid valve according to claim 2, wherein the outer peripheral surface of the casing is provided with an annular groove above the external thread section, an upper portion of the annular groove is configured to allow installation of a casing sealing ring, the casing sealing ring is configured to sealingly fit with the solenoid valve installation passage, the clearance fit surface is located below the casing sealing ring, and the upper casing ventilation hole is provided on a lower portion of a groove bottom wall of the annular groove.

6. The solenoid valve according to claim 5 wherein the release hole comprises a first pilot release passage and a second pilot release passage distributed up and down, the first pilot release passage communicates with the pilot valve port, a cross-sectional area A of the first pilot release passage is less than a cross-sectional area of the second pilot release passage, the upper casing ventilation hole is a straight hole, and a cross-sectional area B of the upper casing ventilation hole satisfies: $A/3 \leq B \leq A$.

7. The solenoid valve according to claim 5, wherein a front end of the pilot valve core has a pilot valve core cone surface and a pilot sealing spherical surface at a top end of the pilot valve core cone surface, the pilot valve port has a pilot head valve port fillet, and the pilot head valve port fillet matches and fits with the pilot sealing spherical surface.

8. The solenoid valve according to claim 5, wherein the annular groove is adjacent to the external thread section, and the annular groove or a portion of the annular groove is an escrape formed when an external thread is processed.

9. The solenoid valve according to claim 8 wherein the release hole comprises a first pilot release passage and a second pilot release passage distributed up and down, the first pilot release passage communicates with the pilot valve port, a cross-sectional area A of the first pilot release passage is less than a cross-sectional area of the second pilot release passage, the upper casing ventilation hole is a straight hole, and a cross-sectional area B of the upper casing ventilation hole satisfies: $A/3 \leq B \leq A$.

10. The solenoid valve according to claim 8, wherein a front end of the pilot valve core has a pilot valve core cone surface and a pilot sealing spherical surface at a top end of the pilot valve core cone surface, the pilot valve port has a pilot head valve port fillet, and the pilot head valve port fillet matches and fits with the pilot sealing spherical surface.

11. The solenoid valve according to claim 1, wherein the slidably-sealed structure is a pilot head sealing ring fixed to and sleeved on the pilot head through a convex ring and a limit circlip provided on a middle portion of the pilot head.

12. The solenoid valve according to claim 11 wherein the release hole comprises a first pilot release passage and a second pilot release passage distributed up and down, the first pilot release passage communicates with the pilot valve port, a cross-sectional area A of the first pilot release passage is less than a cross-sectional area of the second pilot release passage, the upper casing ventilation hole is a straight hole, and a cross-sectional area B of the upper casing ventilation hole satisfies: $A/3 \leq B \leq A$.

13. The solenoid valve according to claim 11, wherein a front end of the pilot valve core has a pilot valve core cone surface and a pilot sealing spherical surface at a top end of the pilot valve core cone surface, the pilot valve port has a pilot head valve port fillet, and the pilot head valve port fillet matches and fits with the pilot sealing spherical surface.

14. The solenoid valve according to claim 1 wherein the release hole comprises a first pilot release passage and a second pilot release passage distributed up and down, the first pilot release passage communicates with the pilot valve port, a cross-sectional area A of the first pilot release passage is less than a cross-sectional area of the second pilot release passage, the upper casing ventilation hole is a straight hole, and a cross-sectional area B of the upper casing ventilation hole satisfies: $A/3 \leq B \leq A$.

15. The solenoid valve according to claim 1, wherein a front end of the pilot valve core has a pilot valve core cone surface and a pilot sealing spherical surface at a top end of the pilot valve core cone surface, the pilot valve port has a pilot head valve port fillet, and the pilot head valve port fillet matches and fits with the pilot sealing spherical surface.

16. The solenoid valve according to claim 15, wherein the pilot valve core is made of metal, the pilot head is made of plastic, and the pilot head valve port fillet is formed by the pilot sealing spherical surface of the pilot valve core impacting the pilot valve port.

17. The solenoid valve according to claim 16, wherein the pilot valve core is made of hydrogen embrittlement resistant stainless steel, and the pilot head is made of polyether ether ketone.

18. A vehicle gas cylinder valve, comprising a base body, wherein the base body is provided with a gas outlet passage, a gas inlet and outlet passage, and a solenoid valve installation passage for installation of a solenoid valve, the gas outlet passage is configured to communicate with an inner portion of a gas cylinder, the gas inlet and outlet passage communicates with a gas inlet and outlet port on the base body, and the solenoid valve installation passage communicates with the gas outlet passage and the gas inlet and outlet passage, wherein the solenoid valve installation passage is provided with the solenoid valve according to claim 1.

* * * * *